May 21, 1940.　　　W. J. VOELKER　　　2,201,566
CULINARY UTENSIL
Filed Aug. 10, 1939
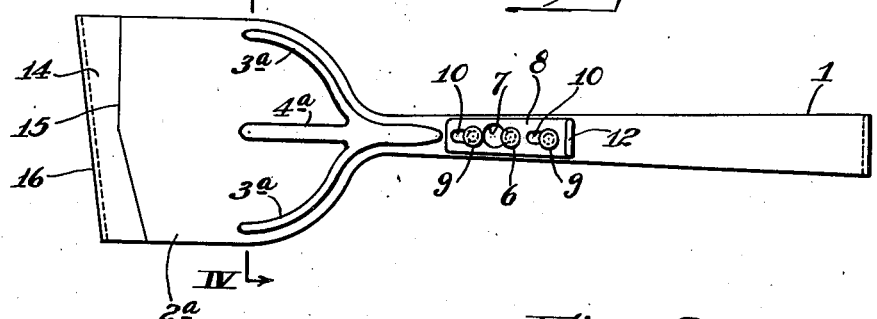
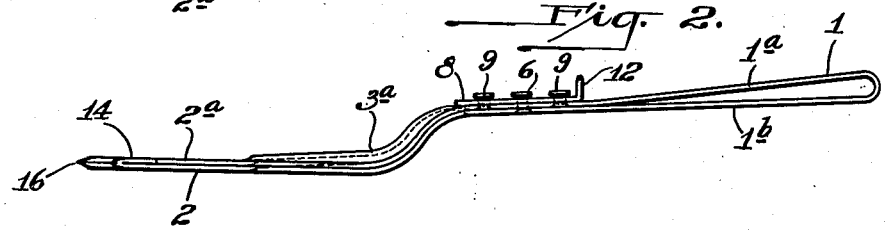
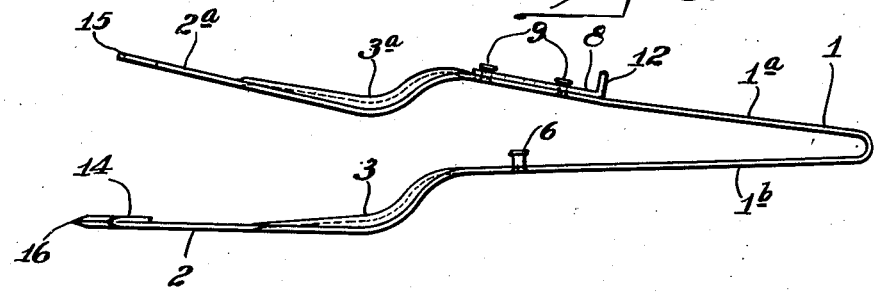
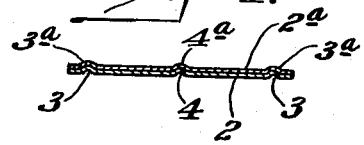
INVENTOR.
Walter J. Voelker
BY Brown, Critchlow & Flick
his ATTORNEYS.

Patented May 21, 1940

2,201,566

UNITED STATES PATENT OFFICE 2,201,566

CULINARY UTENSIL

Walter J. Voelker, McKeesport, Pa.

Application August 10, 1939, Serial No. 289,421

7 Claims. (Cl. 294—2)

This invention relates to culinary utensils and is particularly concerned with a device for handling pancakes, meats and other foods whereby inversion of these objects during cooking is facilitated.

Heretofore in frying pancakes or other food in a pan, a standard flat spatula or turner has been employed most often to invert the food after it has been fried or cooked on one side. Unless a person is very skilled in the use of a flat single-bladed turner of the well-known type the food is apt to slip off the turner during an attempt to invert the food with attendant undesirable results. It has been proposed to provide a culinary utensil with a pair of gripping flat plates to assist in handling pancakes or the like but such prior art apparatus has been relatively expensive and can not be easily operated by the ordinary housewife or other person employing utensils. Moreover, known types of gripping turners are formed with complicated parts including coiled springs, scissor-like arms, and other parts which are difficult to wash and properly dry so that a fully sanitary utensil is not provided. Again, known gripping turners are not adapted to be used as a flat turner because of complicated and interfering structural parts and because food particles are forced between the turner blades when nested together and used as a scraper.

It is a general object of my invention to avoid and overcome the foregoing and other difficulties of prior known culinary utensils of the stated type by the provision of a simplified, relatively inexpensive, sanitary and easily operated apparatus of a type which can be used as an ordinary spatula or turner but which can also be employed to grip and invert meat, pancakes and the like.

Another object of my invention is the provision of a culinary utensil having a pair of relatively movable flat plates formed integral with the ends of a looped spring metal handle and normally urged apart by the spring of the handle but adapted to be moved to and locked in a nested position with each other.

Another and more specific object of my invention is to provide a utensil of the type described wherein relatively lateral movement between the flat plates when in a nested position is prevented and with the plates so constructed and arranged that when nested together they form a substantially flat plate of uniform thickness.

Another object of my invention is to provide a gripper type of pancake turner which can be formed in a stamping operation from a single piece of metal.

The foregoing and other objects of my invention are achieved by the provision of a culinary utensil for handling meat, pancakes and the like which comprises a U-shaped spring metal handle, flat pancake turners formed on each end of the handle and normally held apart by the spring of the handle, but constructed and arranged to be nested together when the handle is squeezed, quickly releasable means for locking the handle together in squeezed position, and means holding the edges of the flat turners together remote from the handle.

For a better understanding of my invention reference should be had to the accompanying drawing wherein Fig. 1 is a plan view of my improved culinary utensil; Fig. 2 is a side elevation of the utensil shown in Fig. 1; Fig. 3 is a side elevation similar to Fig. 2 but with the utensil open to a gripping position; Fig. 4 is a cross-sectional view taken on the line IV—IV of Fig. 1.

In the drawing the numeral 1 indicates, as a whole, a looped handle formed of metal which possesses sufficient resiliency so that normally the ends 1a and 1b of the handle spring apart to provide a U or V shape. Secured to or preferably formed integrally with the end 1b of the handle 1 is a flat turner portion 2 which, as is evident from Figs. 2 and 3, is offset downwardly of the handle 1. In order to strengthen the flat turner portion 2 it is generally formed with side ribs 3 where it merges into the handle 1. Likewise a strengthening rib 4 may be pressed in the center of the flat turner portion to further increase the strength of it.

A flat turner portion 2a is secured to or formed integrally with the leg 1a of the handle 1 and the turner portion 2a is generally provided with laterally-positioned strengthening ribs 3a and a centrally-positioned strengthening rib 4a in a manner similar to the turner portion 2. The size and shape of the turner portion 2a is such that it will nest down flat on top of the turner portion 2 in the manner illustrated in Figs. 1, 2 and 4.

The legs 1a and 1b of the handle 1 are adapted to be locked together in the position shown in Fig. 2 by quickly releasable means. One suitable form of such means is illustrated in the drawing as comprising a headed stud 6 formed on the leg 1b of handle 1 which extends through a keyhole slot 7 formed in a plate 8 slidably secured by headed studs 9 to the leg 1a of the handle 1. The headed studs 9 are received in slots 10 formed in the plate 8 as will be understood. One end of the plate 8 is bent up as at 12 whereby the plate can be readily slid longitudinally of the handle 1 to lock or release the legs of the handle with respect to each other. It will be understood that the headed stud 6 will pass through the enlarged portion of the keyhole slot 7 but that it will not pass through the narrow portion of the slot. The leg 1a of the handle 1 is suitably apertured beneath the keyhole slot 7 so that the headed stud 6 engages only with the keyhole slot 7 as will be understood.

The ends of the flat turner portions 2 and 2a remote from the handle 1 are adapted to be feathered together so that when these turner portions are in nested relation they form a flat plate of substantially uniform thickness adapted to be inserted under any food or the like being handled. The feathered end for the nested plates is conveniently made by folding the end of turner portion 2 back over on itself as illustrated at 14 in the drawing. The turned-over portion 14 is preferably made with a beveled or angled end 15 and the end of the flat turner portion 2a is cut so as to be complementary to and to fit snugly in the angles provided. Likewise, the outermost end of the turned-over portion 14 is formed at an angle to the center line of the utensil so that a better scraping or sliding-under effect is possible when the flat portions 2 and 2a are nested together. The outermost end of the turned-over portion 14 as indicated by the numeral 16 is preferably formed with a relatively sharp edge which is desirable because the utensil can be slid under food more readily and is better adapted to scrape a pan or perform similar operations.

It is believed that the operation of my improved culinary utensil will be completely evident from the foregoing description. Suffice it to say here that the utensil can be used as an ordinary pancake turner or spatula with the portions 2 and 2a locked together. However, when it is desirable to employ the utensil to grip both sides of a pancake or the like to facilitate inverting it in the pan, then the plate 8 is slid away from the portions 2 and 2a to allow these flat portions to move apart to the position shown in Fig. 3. Thereupon the bottom flat portion 2 can be slid under the food and the operator can bring the flat portion 2a down on top of the food by squeezing the portions 1a and 1b together. Thereafter the food can be inverted without any danger of dropping it. After the food has been inverted and released the handle of the utensil can be squeezed to bring the flat portions 2 and 2a of the utensil together in which position they can be locked by moving the plate 8.

I particularly contemplate forming my improved culinary utensil from a single piece of sheet metal by a stamping operation. After stamping, the handle portion of the tool is bent to bring the flat portions 2 and 2a together in a nested relation as will be understood, and the ends of the flat portions are feathered. Thereupon, merely adding the simple, inexpensive lock illustrated to the utensil completes its manufacture. Of course, the flat plate portions 2 and 2a of the tool can be formed separately of the handle and secured thereto by welding or riveting if desired.

It will be recognized that the objects of my invention have been achieved by the provision of a simplified, relatively inexpensive culinary utensil particularly adapted to invert food during cooking. The utensil is readily handled by the ordinary cook and presents no problem of sanitation since it avoids coiled springs, pivoted scissor-like legs and the like.

While I have particularly illustrated and described my invention, all in accordance with the patent statutes, it will be understood that I am not to be limited thereto or thereby but that my invention is defined in the appended claims.

I claim:

1. A culinary utensil for handling meat, pancakes and the like comprising a U-shaped spring metal handle, flat pancake turners formed on each end of the handle and normally held apart by the spring of the handle but constructed and arranged to be nested together when the handle is squeezed, a stud mounted on the inner surface of one arm of the handle, the other arm of the handle being provided with an opening for receiving the stud when the handle is squeezed, and manually operable means slidably mounted on the latter arm for lockably engaging said stud after the handle is squeezed whereby the two arms are detachably locked together.

2. A kitchen utensil for handling meat, pancakes and the like comprising a U-shaped spring metal handle, flat pancake turners formed integrally with each end of the handle and normally held apart by the spring of the handle but constructed and arranged to be nested together when the handle is squeezed, quickly releasable means for locking the handle in the squeezed-together position, and means feathering together the edges of the flat turners remote from the handle and holding the turners against relative lateral movement when nested together.

3. A culinary utensil for handling meat, pancakes and the like comprising a V-shaped spring metal handle, flat pancake turners formed on each end of the handle and normally held apart by the spring of the handle but constructed and arranged to be nested together when the handle is squeezed, quickly releasable means for locking the handle in the squeezed-together position, and means feathering together the edges of the flat turners remote from the handle.

4. A culinary utensil for handling meat, pancakes and the like comprising a V-shaped spring metal handle, flat pancake turners formed integrally on each end of the handle and normally held apart by the spring of the handle but constructed and arranged to be nested together when the handle is squeezed, quickly releasable means for locking the handle in the squeezed-together position, and means independent of said locking means for holding the flat turners against relative lateral movement when in nested relationship.

5. A utensil comprising a looped handle of spring metal, a flat food pickup portion formed integrally with but offset from one end of the handle, a second flat food pickup portion formed integrally with but offset from the other end of the handle so that when the looped handle is pressed together the food pickup portions lie one on top of the other, a lock for holding the ends of the looped handle together, and means for feathering together the edges of the food pickup portions remote from the handle so that the portions can be slipped under a food morsel.

6. A culinary utensil for handling meat, pancakes and the like formed from a single piece of sheet metal and comprising a U-shaped spring metal handle, flat pancake turners formed integrally with each end of the handle and normally held apart by the spring of the handle but constructed and arranged to be nested together when the handle is squeezed, and quickly releasable means for locking the handle in the squeezed-together position, the bottom of one of said turners being formed with a folded-back outer edge and the upper turner being terminated just short of and complementary to the folded-back edge so that a flat body of uniform depth is provided when the turners are nested together.

7. A culinary utensil for handling meat, pancakes and the like formed from a single piece of sheet metal and comprising a U-shaped spring metal handle, and flat pancake turners formed integrally with each end of the handle and normally held apart by the spring of the handle but constructed and arranged to be nested together when the handle is squeezed, the bottom of one of said turners being formed with a folded-back outer edge and the upper turner being terminated just short of and complementary to the folded-back edge so that a flat body of uniform depth is provided when the turners are nested together.

WALTER J. VOELKER.